US008844569B2

(12) United States Patent
Lin et al.

(10) Patent No.: US 8,844,569 B2
(45) Date of Patent: Sep. 30, 2014

(54) ELECTRIC THREE-WAY VALVE

(71) Applicant: Zhejiang Sanhua Co., Ltd., Zhejiang (CN)

(72) Inventors: Yanwei Lin, Zhejiang (CN); Xuming Hui, Zhejiang (CN); Dingshuai Feng, Zhejiang (CN); Bin Chen, Zhejiang (CN)

(73) Assignee: Zhejiang Sanhua Co., Ltd., Zhejiang (CN)

( * ) Notice: Subject to any disclaimer, the term of this patent is extended or adjusted under 35 U.S.C. 154(b) by 119 days.

(21) Appl. No.: 13/660,335

(22) Filed: Oct. 25, 2012

(65) Prior Publication Data

US 2013/0134336 A1        May 30, 2013

(30) Foreign Application Priority Data

Nov. 25, 2011    (CN) .......................... 2011 1 0381775
Apr. 25, 2012    (CN) .......................... 2012 1 0125797

(51) Int. Cl.
| F16K 11/085 | (2006.01) |
| F16K 11/06 | (2006.01) |
| F16K 11/14 | (2006.01) |
| F16K 31/04 | (2006.01) |
| F25B 5/02 | (2006.01) |

(52) U.S. Cl.
USPC .................... 137/625.45; 62/117; 251/129.11; 251/287

(58) Field of Classification Search
CPC ............. F16K 3/06; F16K 3/08; F16K 11/06; F16K 11/0853; F16K 11/0655; F16K 11/074; F16K 11/10
USPC ............ 137/625.45, 625.15, 625.64, 625.65, 137/625.46, 862, 865, 870; 251/214, 251/129.11, 129.12, 284, 285, 287; 62/117
See application file for complete search history.

(56) References Cited

U.S. PATENT DOCUMENTS

| 4,139,355 | A | * | 2/1979 | Turner et al. .................. 62/324.6 |
| 4,860,794 | A | * | 8/1989 | Parrott et al. ............... 137/637.2 |
| 5,732,739 | A | * | 3/1998 | Ota .......................... 137/625.46 |
| 5,787,929 | A | * | 8/1998 | Iwata ........................ 137/625.43 |
| 6,505,647 | B2 | * | 1/2003 | Sasada et al. ............ 137/625.43 |

(Continued)

FOREIGN PATENT DOCUMENTS

| JP | 03-028583 A | 2/1991 |
| JP | 2000-346227 A | 12/2000 |

*Primary Examiner* — John Rivell
*Assistant Examiner* — Kevin Barss
(74) *Attorney, Agent, or Firm* — Westerman, Hattori, Daniels & Adrian, LLP

(57) ABSTRACT

An electric three-way valve comprises: an input port, a plurality of output ports and a valve core which rotates in a sliding manner in the valve seat by a driving force of a motor unit, wherein the valve core selectively opens or closes the plurality of output ports, the motor unit is attached as a separated constituent to an outside of an upper end surface of a cylindrical casing introducing refrigerant, the valve core is driven by a gear unit which transmits the driving force of the motor unit and is disposed inside the cylindrical casing, the cylindrical casing includes one opening portion and a side wall with an apex portion, a housing which is fixed to a cylindrical wall portion of the apex portion and is equipped with the motor unit is uprightly formed in the other opening portion, and the housing is attached to the cylindrical casing.

7 Claims, 11 Drawing Sheets

(56) References Cited

U.S. PATENT DOCUMENTS

| | | | |
|---|---|---|---|
| 6,880,802 B2* | 4/2005 | Hara et al. | 251/208 |
| 6,918,408 B2* | 7/2005 | Hara | 137/597 |
| 7,437,888 B2* | 10/2008 | Son et al. | 62/527 |
| 7,540,301 B2* | 6/2009 | Tuymer | 137/514 |
| 7,637,116 B2* | 12/2009 | Park | 62/222 |
| 7,793,915 B2* | 9/2010 | Ozawa et al. | 251/248 |
| 2004/0026647 A1* | 2/2004 | Hashimoto | 251/248 |
| 2010/0108925 A1* | 5/2010 | Kannoo et al. | 251/129.11 |

* cited by examiner

ELECTRIC THREE-WAY VALVE

BACKGROUND OF THE INVENTION

1. Field of the Invention

The present invention relates to an electric three-way valve which circulates refrigerant of an air-conditioner and a refrigerator and switches a passageway.

2. Description of the Related Art

In general, there is known a valve which uses a motor, for example, a step motor, installs a gear in a shaft end portion of a rotor of the motor, and blocks one passageway opened to a valve seat by rotating a valve core in the valve seat in a sliding manner using a driving force generated by the meshing between the gear and a gear driving the valve core (see Japanese Patent Literature 1, that is, JP 03-28583 A). Furthermore, there is known a valve which controls an opening degree of an opening by a valve core driven so as to slide on a valve seat by a driving force generated by a gear as described above (see Japanese Patent Literature 2, that is, JP 2000-346227 A).

In the typical valve which uses the valve core rotating so as to slide on the valve seat, a casing which accommodates the valve core and the gear is integrated with a housing which includes the rotor of the motor therein. For this reason, there is a case in which a wall which constitutes the housing and is formed of a non-magnetic material, for example, stainless steel is relatively thickened. When the housing is thickened, the magnetic characteristics of the step motor are degraded and the torque of the motor decreases. Accordingly, in order to obtain a predetermined torque of the motor, there is a need to increase the output of the step motor. As a result, an electric three-way valve (or an electric switching valve) increases in size and a space occupied by the electric three-way valve when configuring a refrigerant circulation system increases in volume.

Furthermore, in the typical valve core which rotates in a sliding manner, the shape of the valve core which may easily and smoothly slide on the valve seat is not taken into consideration.

SUMMARY OF THE INVENTION

The invention is made in view of the above-described problems, and it is an object of the invention to provide an electric three-way valve capable of realizing a decrease in the volume of an occupied space by preventing an increase in the size of a coil, maintaining a valve core in a satisfactory parallel state, and ensuring the sliding of the valve core in the rotation direction in a valve seat.

Further, it is another object of the invention to provide an electric switching valve capable of realizing a decrease in the volume of an occupied space by preventing an increase in the size of a coil, maintaining a valve core in a satisfactory parallel state, and ensuring the sliding of the valve core in the rotation direction in a valve seat.

In order to solve the above-described technical problems, according to an aspect of the invention, there is provided an electric three-way valve including: an input port which is opened to a surface of a valve seat; a plurality of output ports which are disposed at the same interval and are formed as openings; and a valve core which rotates in a sliding manner in the valve seat by a driving force of a motor unit and selectively opens or closes the plurality of output ports, wherein the motor unit is attached as a separated constituent to an outside of an upper end surface of a cylindrical casing introducing refrigerant, wherein the valve seat is provided in an opening portion of a lower end of the cylindrical casing, wherein the valve core is driven by a gear unit which transmits the driving force of the motor unit and is disposed inside the cylindrical casing, wherein the cylindrical casing includes one opening portion and a side wall with an apex portion, wherein the valve seat is provided in the one opening portion, wherein the other opening portion is provided in the apex portion by the cylindrical wall portion, wherein a housing which is fixed to the cylindrical wall portion and is equipped with the motor unit is uprightly formed in the other opening portion, and wherein the housing is attached to the cylindrical casing.

In the electric three-way valve of the aspect of the invention, since the motor unit is attached as a separated constituent to the outside of the cylindrical casing provided with the valve core rotating so as to slide on the valve seat and the gear unit transmitting the driving force of the motor unit to the valve core, it is possible to decrease the volume of the occupied space by preventing an increase in the size of the electric three-way valve. Furthermore, the housing which constitutes the motor unit is attached as a separated constituent to the cylindrical casing. Furthermore, since the other circumferential end of the cover of the housing is welded to the cylindrical wall portion, the housing which constitutes the motor unit is strongly fixed to the cylindrical casing and is uprightly attached to the outside of the casing.

In the electric three-way valve, the housing includes a lower cap, and the lower cap is fixed to the other circumferential end of the housing.

In the electric three-way valve, a limiting pin which comes into contact with a limiting portion of the valve core is provided in the valve seat, a pressure plate is disposed inside the cylindrical casing, and the pressure plate is fixed to an upper end of the limiting pin so as to hold the limiting pin.

In the electric three-way valve, one side surface of the pressure plate comes into contact with the side wall of the cylindrical casing.

In the electric three-way valve, a plate spring is attached to the pressure plate, and the plate spring comes into contact with the valve core by an elastic force.

Compared to the related art, the invention has the following characteristics and advantages.

According to the aspect of the invention, the electric three-way valve capable of selectively opening or closing the output ports in the valve seat is provided. Since the motor unit and the cylindrical casing accommodating the gear unit driven by the motor unit and the valve core rotationally driven by the gear unit are individually provided, when an increase in the size of the coil constituting the motor unit is prevented, it is possible to provide the electric three-way valve capable of realizing a decrease in the volume of the occupied space without causing an increase in size and accurately and selectively opening or closing the output ports.

Furthermore, since the limiting pin and a bearing member of the invention are strongly supported by the valve seat and are strongly held by the pressure plate, it is possible to accurately maintain the installation positions of the limiting pin and the bearing member in the valve seat for a long period of time. Accordingly, it is possible to stably perform an operation of selectively opening or closing the output port P1 and the output port P2 by the valve core of the electric three-way valve without any change and to accurately open or close the electric three-way valve for a long period of time.

Furthermore, in order to solve the above-described technical problems, according to another aspect of the invention, there is provided an electric switching valve including: an input port which is opened to a surface of a valve seat; a plurality of output ports which are disposed at the same interval and are formed as openings; and a valve core which rotates in a sliding manner in the valve seat by a driving force of a motor unit and selectively opens or closes the plurality of output ports, wherein the motor unit is attached as a separated constituent to an outside of an upper end surface of a cylindrical casing introducing refrigerant, wherein the valve seat is provided in an opening portion of a lower end of the cylindrical casing, and wherein the valve core is driven by a gear unit which transmits the driving force of the motor unit and is disposed inside the cylindrical casing.

In the electric switching valve of the aspect of the invention, since the motor unit is attached as a separated constituent to the outside of the cylindrical casing provided with the valve core rotating so as to slide on the valve seat and the gear unit transmitting the driving force of the motor unit to the valve core, it is possible to realize a decrease in the volume of the occupied space by preventing an increase in the size of the electric switching valve.

In the electric switching valve, the motor unit is a step motor and includes a cylindrical housing which is uprightly formed outward from an upper end of the cylindrical casing and is formed of a non-magnetic metal material, a rotor which is provided inside the housing, and a fixed coil which is provided in an outer periphery of the housing. In the electric switching valve of the aspect of the invention, since the motor unit includes the cylindrical housing which is uprightly formed on the outside of the casing and is formed of the non-magnetic metal material, it is possible to provide the electric switching valve which decreases in size by thinning the wall thickness of the housing and realizing a decrease in the size of the coil.

Furthermore, in the electric switching valve, a center portion of the valve core is formed in a disk shape, the valve core includes flange portions symmetrically protruding toward both outsides from an outer periphery of the disk-like center portion, one flange portion of the valve core is formed as a bearing portion of a driving shaft of the gear unit, and the other flange portion of the valve core is formed as a stopping portion. In the electric switching valve of the aspect of the invention, since the valve core includes the disk portion and the flange portions symmetrically protruding outward from the outer periphery of the disk portion, the valve core may be maintained in a satisfactory parallel state and may be easily and smoothly slide on the valve seat.

In the electric switching valve, the stopping portion of the valve core comes into contact with a stopping pin, and the stopping pin is disposed with a predetermined gap with respect to the plurality of output ports in the valve seat. The electric switching valve of the aspect of the invention may ensure the sliding operation of the valve core in a sliding manner and accurately and selectively open or close the output ports.

Compared to the related art, the invention has the following characteristics and advantages.

According to the aspect of the invention, the electric switching valve capable of selectively opening or closing the output ports in the valve seat is provided. Since the motor unit and the cylindrical casing accommodating the gear unit driven by the motor unit and the valve core rotationally driven by the gear unit are individually provided, when an increase in the size of the coil constituting the motor unit is prevented, it is possible to provide the electric switching valve capable of realizing a decrease in the volume of the occupied space without causing an increase in size and accurately and selectively opening or closing the output ports.

BRIEF DESCRIPTION OF THE DRAWINGS

The following drawings are only used for the schematic description and analysis of the invention and do not limit the scope of the invention.

DETAILED DESCRIPTION OF THE PREFERRED EMBODIMENTS

Figure 1:
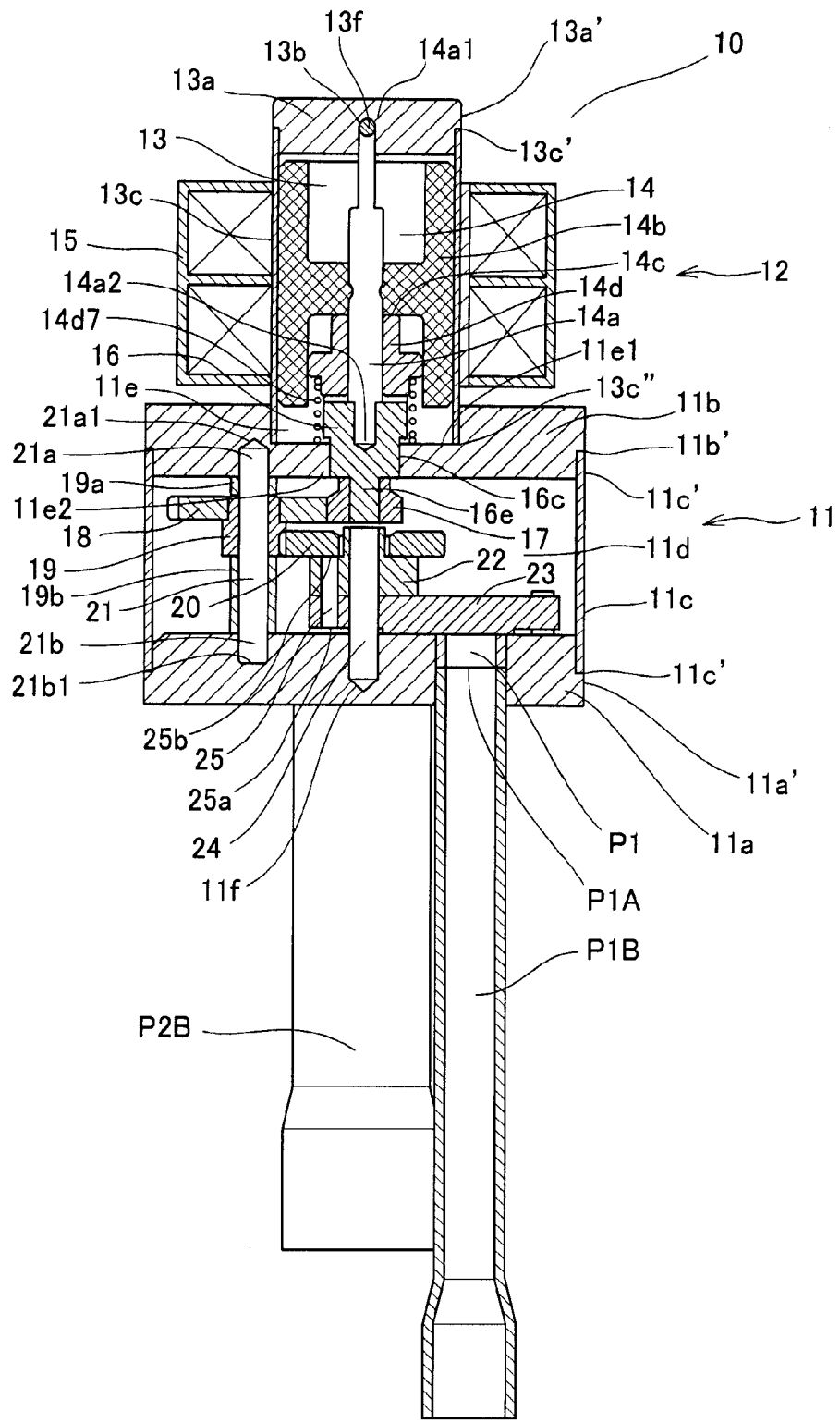
FIG. 1 is a longitudinal sectional view illustrating an electric three-way valve according to a configuration of a first embodiment of the invention.

An electric three-way valve 10 as an electric switching valve illustrated in FIG. 1 includes a cylindrical casing 11 which is formed of a metal material, for example, stainless steel and a motor unit 12. The motor unit 12 includes a cylindrical housing 13 which is formed of a non-magnetic metal material, for example, stainless steel, a rotor 14 and a rotor shaft 14a which are disposed inside the housing, and a fixed coil 15 which is laid on the outside of the housing 13 and serves as a stator to drive the rotor 14, where the motor unit 12 is separated from the casing 11 and is disposed at the upper outer side of the casing 11 in the drawings.

The cylindrical casing 11 includes a disk-like valve seat (which is also called a valve seat surface) 11a which is formed of a metal material, for example, stainless steel, a disk-like plane plate 11b which is disposed so as to face the valve seat 11a, serves as an upper end surface, and is formed of a metal material, for example, stainless steel, and a cylindrical side wall 11c which is installed between the valve seat 11a and the plane plate 11b.

The cylindrical side wall 11c is formed of a metal material, for example, stainless steel, and a circumferential edge 11c', a circumferential end 11a' of the valve seat 11a, and a circumferential end 11b' of the plane plate 11b are fixed to the valve seat 11a and the plane plate 11b by welding, for example, laser-welding. Accordingly, the casing 11 is formed as an air-tight valve cavity 11d.

The housing 13 of the motor unit 12 includes a disk-like upper cap 13a which is formed of a metal material, for example, stainless steel and a cover 13c which is formed of a cylindrical non-magnetic metal material, for example, stainless steel, where a concave portion 13b to be described later is formed at the center of the upper cap 13a, a circumferential end 13a' of the upper cap 13a and one circumferential end 13c' of the cover 13c are fixed by welding, for example, laser-welding, the other circumferential end 13c" of the cover 13c comes into contact with a step portion 11e1 of a large-diameter center concave portion 11e formed at the center of the plane plate 11b of the casing 11, and the other circumferential end 13c" is installed inside the large-diameter center concave portion 11e. Furthermore, a small-diameter opening portion 11e2 which is formed by the connection of the other circumferential end 13c" and the step portion 11e1 of the large-diameter center concave portion 11e is formed at the center of the plane plate 11b.

The other circumferential end 13c" of the cover 13c is welded to the center concave portion 11e of the plane plate 11b by welding, for example, laser-welding, and the cover 13c is fixed to the plane plate 11b.

In this way, the housing 13 which is formed as a hermetic casing including the upper cap 13a and the cover 13c is uprightly installed on the casing 11, and the housing 13 which constitutes the hermetic casing is separated from the casing 11 and is attached to the upper side of the casing 11, that is, the outside of the plane plate 11b as the upper end surface. Furthermore, the rotor shaft 14a is rotatably supported by the center portion of the rotor 14 inside the housing 13, the rotor 14 is disposed inside the housing 13, a fixed coil 15 as a stator is attached to the outer peripheral portion of the housing 13, the rotor 14 is rotated by the electromagnetic force of the fixed coil 15, and the rotor shaft 14a is also rotated, thereby configuring the motor unit 12 as a step motor. Furthermore, since the fixed coil 15 is already disclosed in JP 03-28583 A and JP 2000-346227 A, the fixed coil has a known structure.

Figure 1A:
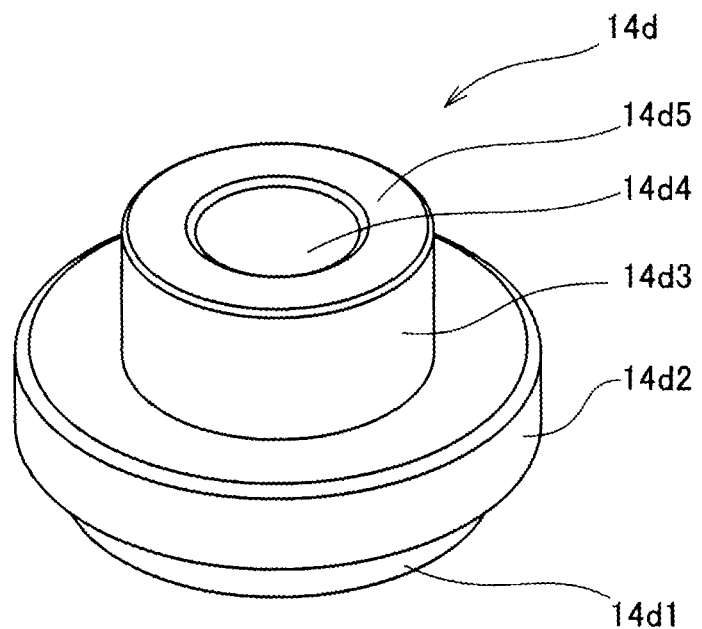
FIG. 1A is a perspective view illustrating a support member of a main part and FIG. 1B is a longitudinal sectional view illustrating the support member.
Figure 1B:
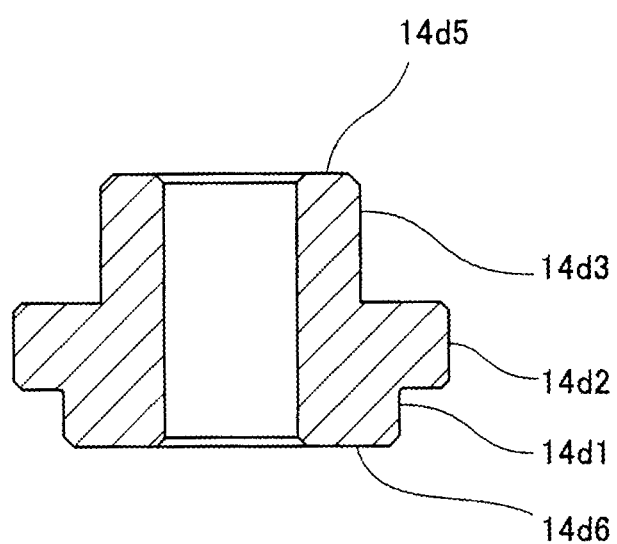
Figure 2A:
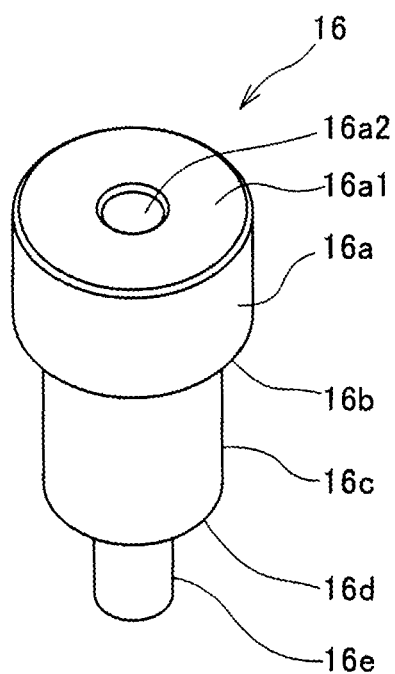
FIG. 2A is a perspective view illustrating a connection member of the main part of FIG. 1
Figure 2B:
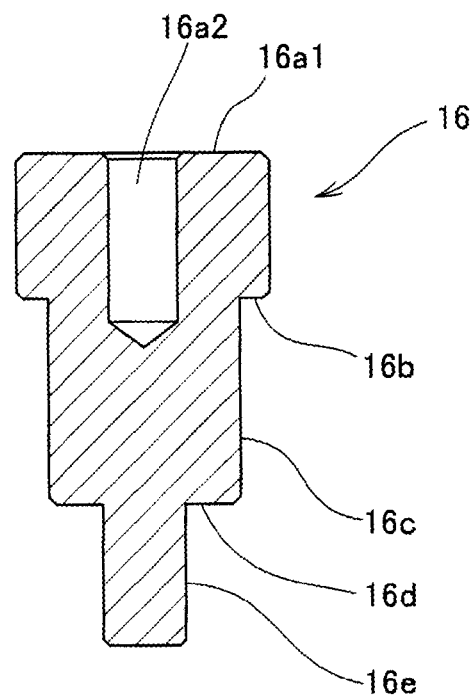
FIG. 2B is a longitudinal sectional view illustrating the connection member.
Figure 3A:
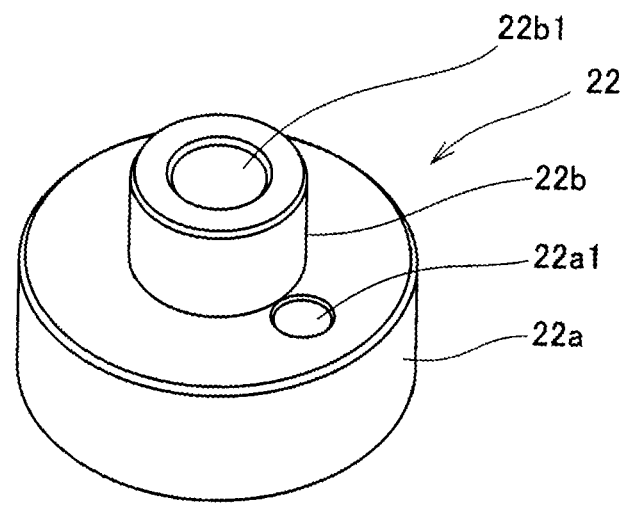
FIG. 3A is a perspective view illustrating a pedestal member of the main part of FIG. 1
Figure 3B:
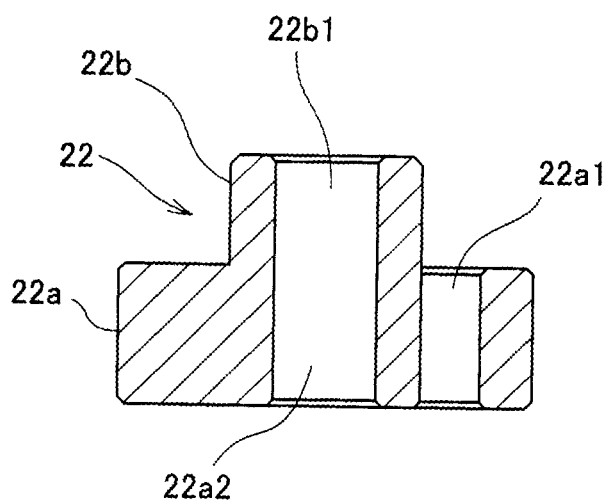
FIG. 3B is a longitudinal sectional view illustrating the pedestal member.
Figure 4A:
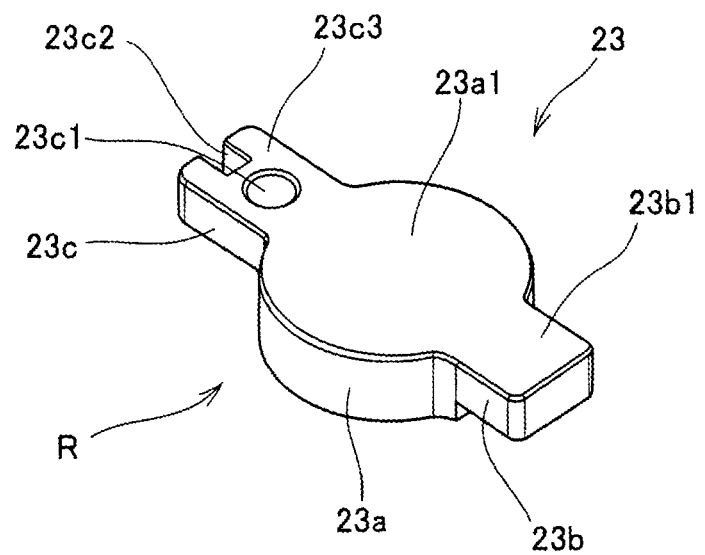
FIG. 4A is a perspective view illustrating a valve core of the main part of FIG. 1
Figure 4B:
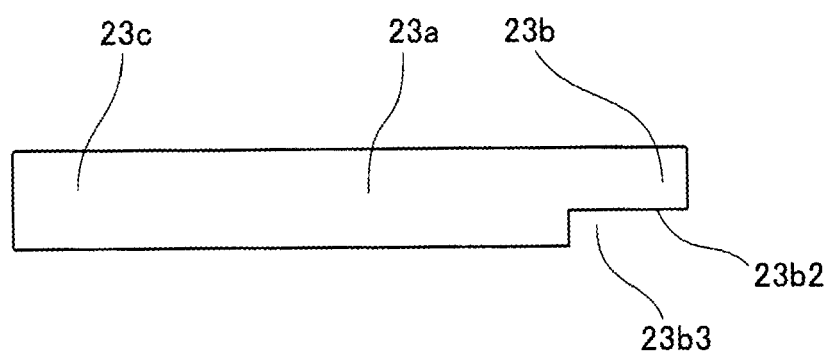
FIG. 4B is a longitudinal sectional view illustrating the valve core.

The outer peripheral surface of the rotor 14 is formed in the cylindrical member 14b and the rotor 14 includes a transverse shaft 14c which is formed at the center of the cylindrical member 14b. The rotor shaft 14a penetrates the center of the transverse shaft 14c, and is, for example, insert-molded into the transverse shaft 14c, thereby installing the center portion of the rotor shaft 14a. Furthermore, an upper end 14a1 of the rotor shaft 14a is inserted into the concave portion 13b of the disk-like upper cap 13a of the housing 13 and comes into contact with a bearing 13f of a bottom portion of the concave portion 13b, and the concave portion 13b serving as a bearing portion supports the rotor shaft 14a. The lower portion of the rotor shaft 14a is supported by the support member 14d, and a lower end 14a2 of the rotor shaft 14a is supported by the connection member 16. The support member 14d is formed of, for example, stainless steel or PPS resin, and as illustrated in FIGS. 1A and 1B, the structure of the support member 14d is disposed between the transverse shaft 14c of the rotor 14 and a connection member 16. That is, as illustrated in FIGS. 1A and 1B, the support member 14d includes a large-diameter disk portion 14d1, a convex portion 14d2 which protrudes toward the outer periphery of the disk portion 14d1, and a small-diameter cylindrical portion 14d3 which is uprightly and integrally formed in the convex portion 14d2. FIG. 1A is a perspective view illustrating the support member 14d and FIG. 1B is a longitudinal sectional view of FIG. 1. In the support member 14d of FIGS. 1A and 1B, a through-hole 14d4 inside the cylindrical portion 14d3 penetrates the center portion of the disk portion 14d1, an upper end 14d5 of the cylindrical portion 14d3 and a lower end 14d6 of the disk portion 14d1 respectively come into contact with the transverse shaft 14c of the rotor 14 and the connection member 16, and the support member 14d is disposed between the transverse shaft 14c of the rotor 14 and the connection member 16. Furthermore, a support spring 14d7 is disposed between the convex portion 14d2 of the support member 14d and the step portion 11e1 of the plane plate 11b of the casing 11, and the support spring 14d7 supports the support member 14d upward. The rotor shaft 14a is inserted into the through-hole 14d4 of the support member 14d, and the support member 14d serves as a support cylinder which supports the lower portion of the rotor shaft 14a, thereby supporting the rotation of the rotor shaft 14a. The rotor shaft 14a penetrates the through-hole 14d4, and the lower end 14a2 of the rotor shaft 14a is supported by the connection member 16. That is, the connection member 16 is formed of a metal material, for example, stainless steel so as to have a cylindrical shape with a step portion, and the structure of the connection member 16 is illustrated in FIGS. 2A and 2B. FIG. 2A is a perspective view illustrating the connection member 16, and FIG. 2B is a longitudinal sectional view thereof. As illustrated in FIGS. 2A and 2B, in the connection member 16, a medium-diameter cylindrical portion 16c is formed by connecting a large-diameter cylindrical portion 16a and a step portion 16b, a small-diameter cylindrical portion 16e is formed by connecting the medium-diameter cylindrical portion 16c and a step portion 16d, and a circular hole 16a2 having a bottom portion is formed in a center portion of a plane 16a1 of the large-diameter cylindrical portion 16a. The connection member 16 connects the motor unit 12 and the casing 11 to each other, and the housing 13 is attached as a separated constituent to the casing 11. That is, as illustrated in FIG. 1, the housing 13 which is a member separated from the casing 11 is uprightly installed in the center concave portion lie of the plane plate 11b of the casing 11 and is attached to the outside of the casing 11. In FIG. 1, the large-diameter cylindrical portion 16a of the connection member 16 is disposed in the step portion 11e1 of the center concave portion lie of the plane plate 11b. Further, the medium-diameter cylindrical portion 16c is inserted into the opening portion 11e2 of the plane plate 11b of the casing 11 with a gap therebetween, and the small-diameter cylindrical portion 16e is disposed inside the valve cavity 11d of the casing in a protruding manner. The lower end 14a2 of the rotor shaft 14a is fitted into the circular hole 16a2 with the bottom portion of the large-diameter cylindrical portion 16a of the connection member 16 by press-fitting, and the connection member 16 is rotationally driven by the rotor shaft 14a. A first gear 17 is fitted into the outer periphery of the small-diameter cylindrical portion 16e. Accordingly, since the rotor 14, the rotor shaft 14a, the connection member 16, and the first gear 17 are integrated with each other by the above-described structure, they may rotate. In FIG. 1, the support member 14d which is disposed in the connection member 16 is provided as the support cylinder which supports the lower portion of the rotor shaft 14a, but even when the support member 14d is not provided, the rotor shaft 14a may surely rotate. As illustrated in FIG. 1, a second gear 18 which meshes with the first gear 17 is provided inside the valve cavity 11d of the casing 11, and a third gear 19 which meshes with the second gear 18 is formed around a cylindrical bearing member 21. The third gear 19 includes an upper-stage gear 19a and a lower-stage gear 19b, and the second gear 18 and the upper-stage gear 19a rotate while meshing with each other. The bearing member 21 is fixed between the plane plate 11b and the valve seat 11a of the casing 11 by both ends 21a and 21b of the bearing member 21. The bearing member 21 is formed of, a metal material, for example, stainless steel, and is fixed by press-inserting both ends 21a and 21b into an upper shaft hole 21a1 of the plane plate 11b and a lower shaft hole 21b1 of the valve seat 11a. The lower-stage gear 19b of the third gear 19 meshes with a fourth gear 20, and when the fourth gear 20 rotates, the rotation is transmitted to a pedestal 22. The pedestal 22 is formed of a metal material, for example, stainless steel, and as illustrated in FIGS. 3A and 3B, the pedestal 22 includes a large-diameter disk-like base portion 22a and a cylindrical portion 22b which is uprightly formed in a base portion 22a, and the cylindrical portion 22b is integrally formed with the base portion 22a by connecting an inner portion 22b1 to a through-hole 22a2 of the base portion 22a having the same diameter. Furthermore, in the base portion 22a, the through-hole 22a1 is formed in the radial direction so as to be adjacent to the cylindrical portion 22b, and the through-hole 22a1 is a shaft hole. The fourth gear 20 is fixed to the outer periphery of the cylindrical portion 22b by press-inserting or welding, for example, laser-welding, and the rotation of the fourth gear 20 is transmitted to the pedestal 22. FIG. 3A is a perspective view illustrating the pedestal 22 and FIG. 3B is a longitudinal sectional view thereof. In this way, the first gear 17, the second gear 18, the third gear 19, and the fourth gear 20 constitute a gear set inside the casing 11. A valve core 23 is interposed between the pedestal 22 having the structure illustrated in FIGS. 3A and 3B and the valve seat 11a of the casing 11. The valve core 23 is formed of a metal material, for example, stainless steel, and as illustrated in FIGS. 4A and 4B, includes a disk-like center base portion 23a and one flange portion 23b and the other flange portion 23c which protrude in the radial direction from the outer periphery of the center base portion 23a and are provided in the center base portion 23a so as to be symmetrical to each other, and the flange portion 23b and the flange portion 23c are formed in a square shape. FIG. 4A is a perspective view illustrating the valve core 23, and FIG. 4B is a longitudinal sectional view when FIG. 4A is observed in the direction of the arrow R. One flange portion 23b and the other flange portion 23c respectively include upper surfaces 23b1 and 23c3 which are positioned at the same plane as that of the upper surface 23a1 of the center base portion 23a. A lower surface 23b2 of one flange portion 23b has a thickness slightly thinner than that of the center base portion 23a and includes a recess portion 23b3, and the other flange portion 23c and the center base portion 23a have the same thickness. In the other flange portion 23c, a through-hole 23c1 is provided so as to be adjacent to the center base portion 23a, and a notched concave portion 23c2 is formed so as to be adjacent to the through-hole 23c1. As illustrated in FIG. 1, the shaft 24 which is inserted through the inner portion 22b1 of the small-diameter cylindrical portion 22b of the pedestal 22 and the through-hole 22a2 of the base portion 22a penetrates the through-hole 23c1 of the other flange portion 23c of the valve core 23, and the shaft 24 is fixed by being press-inserted into a bearing hole 11f of the valve seat 11a. The shaft 25 which penetrates the through-hole 22a1 of the large-diameter base portion 22a of the pedestal 22 is installed in the valve seat 11a by being inserted through the concave portion 23c2 of the other flange portion 23c of the valve core 23. One end 25a of the shaft 25 is slightly short and does not come into contact with the valve seat 11a. Furthermore, the other end 25b of the shaft 25 comes into contact with the fourth gear 20. By the shaft 24 and the shaft 25, the valve core 23 is rotatably interposed between the pedestal 22 and the valve seat 11a.

Figure 5:
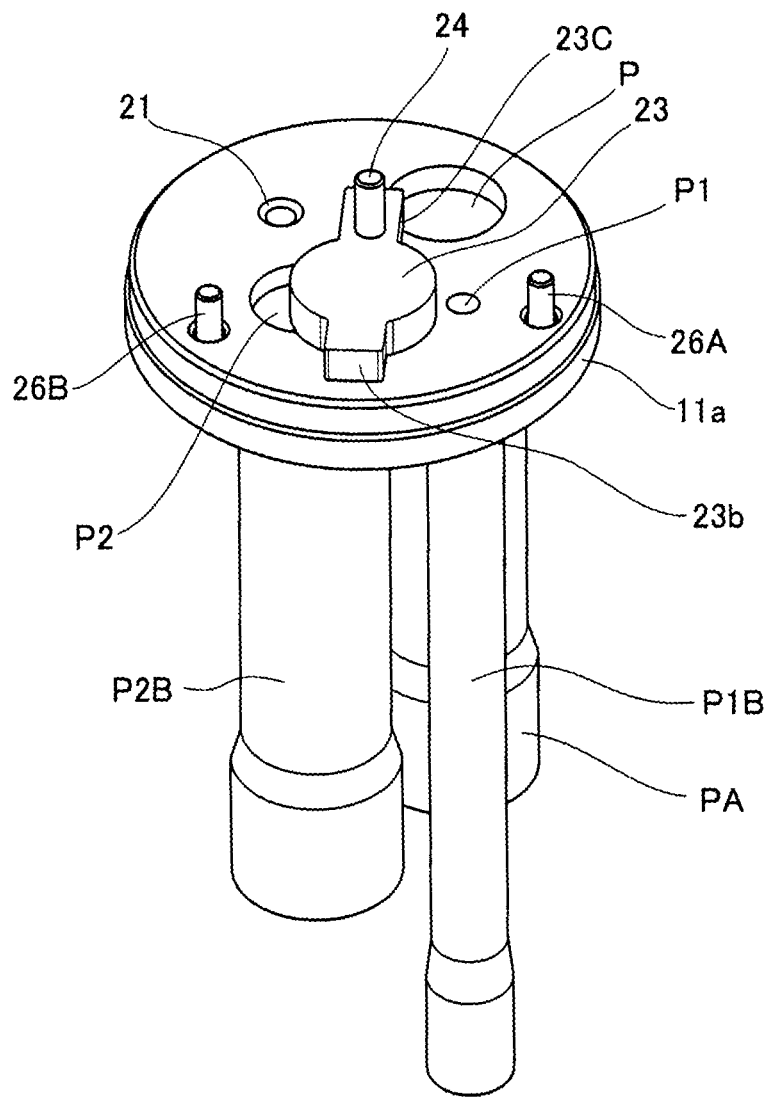
FIG. 5 is a plan view illustrating a valve core and a valve seat of a main part of the invention.

Hereinafter, an operation of the electric three-way valve of the invention will be described based on the action of the valve core 23. FIG. 5 is a perspective view illustrating the valve seat 11a and the valve core 23, and the other constituents will not be illustrated. In FIG. 5, the valve seat 11a is provided with a refrigerant input port P which is opened to the valve core 23 of the valve seat 11a and a first output port P1 and a second output port P2 from which refrigerant flows out. Furthermore, in FIG. 5, an input pipe PA, an output pipe P1B, and an output pipe P2B which are connected to the input port and the output port and are formed of a metal material, for example, copper are also illustrated. Furthermore, as illustrated in FIG. 1, the first output port P1 includes an outlet port P1A which is formed in the valve seat 11a and an output pipe P1B which is connected to the outlet port P1A. As illustrated in FIG. 1, the output pipe P1B is inserted into the valve seat 11a from the surface facing the valve core 23 of the valve seat 11a, and is fixed to the valve seat 11a by welding. The connection between the input pipe PA and the input port P and the connection between the output pipe P2B and the output port P2 are performed as in the connection of the output pipe P1B.

The electric three-way valve of the invention may be equipped with a limiting device (also called a stopping device) in accordance with a demand. Pins 26A and 26B illustrated in FIG. 5 are limiting pins (also called stopping pins), are formed of stainless steel as a metal material, and are fixed to the valve seat 11a by press-inserting.

Figure 5A:
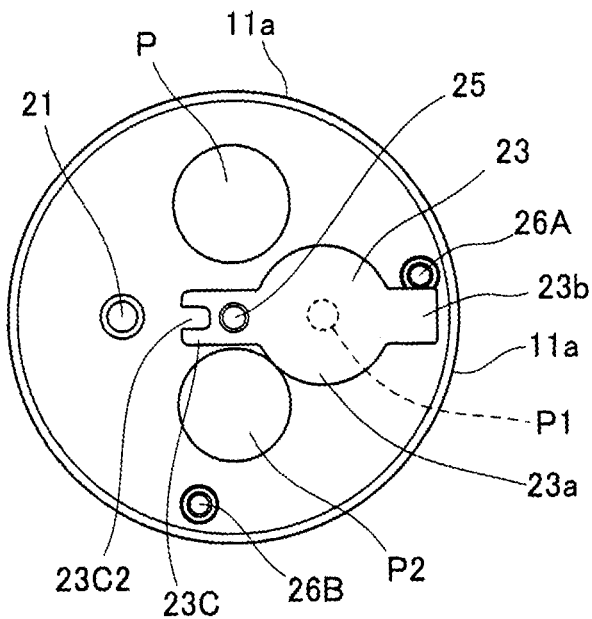
FIGS. 5A and 5B are plan views respectively illustrating an operation of the valve core.
Figure 5B:
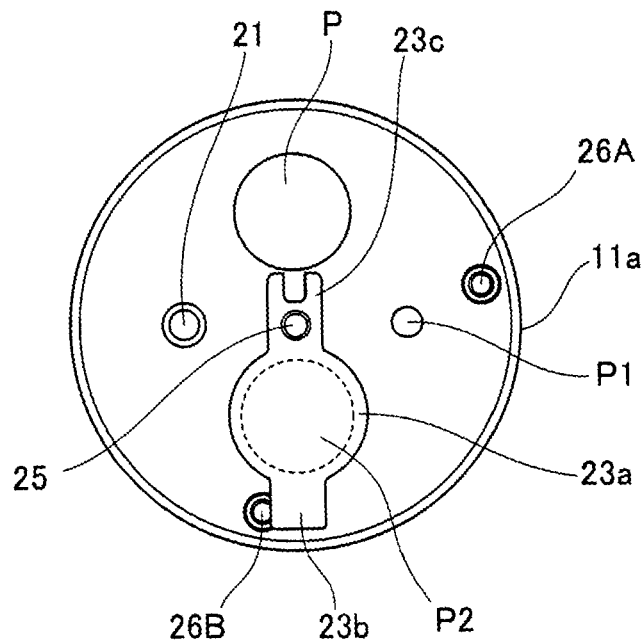

The rotor 14 of the step motor rotates by the necessary amount in response to the pulse signal input to the fixed coil 15 of FIG. 1, and the rotation is transmitted by the rotation of the gear set. The other flange portion 23c of the valve core 23 rotates around the shaft 24 and the shaft 25 along with the pedestal 22, and as illustrated in FIG. 5A, the valve core 23 rotates in the counter-clockwise direction so as to slide in the valve seat 11a. In the counter-clockwise direction, the center base portion 23a of the valve core 23 blocks the output port P1, and the output port P1 is closed. The refrigerant which flows from the input port P into the valve cavity 11d of the casing 11 flows out from the output pipe P1B, and the refrigerant flows out from the output port P2 to the output pipe P2B. At this time, one flange portion 23b of the valve core 23 comes into contact with the limiting pin 26A, thereby reliably stopping the sliding rotation of the valve core 23. Furthermore, the rotor 14 rotates by the necessary amount in response to the pulse signal, and the valve core 23 rotates in a sliding manner in the valve seat 11a in the clockwise direction illustrated in FIG. 5B. The center base portion 23a of the valve core 23 blocks the output port P2, and the output port P2 is closed. Then, the refrigerant which flows from the input port P into the valve cavity 11d of the casing 11 flows out of the output pipe P2B, and the refrigerant flows from the output port P1 into the output pipe P1B. Furthermore, when one flange portion 23b of the valve core 23 comes into contact with the limiting pin 26B, the sliding rotation of the valve core 23 may be reliably stopped. Accordingly, the valve core 23 may accurately block the output port P1 and the output port P2 by the limiting pins 26A and 26B. FIGS. 5A and 5B are plan views of FIG. 5. The valve core 23 includes the center base portion 23a, one flange portion 23b, and the other flange portion 23c. One flange portion 23b may be configured as a limiting portion (also called a stopping portion), the other flange portion 23c may be configured as a rotation portion which rotates around the shaft 24 and the shaft 25, and then the center base portion 23a may be configured as a valve portion which blocks the output ports P1 and P2. Accordingly, the valve core 23 may smoothly rotates in a sliding manner in the clockwise direction or the counter-clockwise direction in a parallel state.

In this way, it is possible to provide the electric three-way valve capable of accurately and selectively opening or closing the output port P1 and the output port P2 by the valve core 23.

Figure 6:
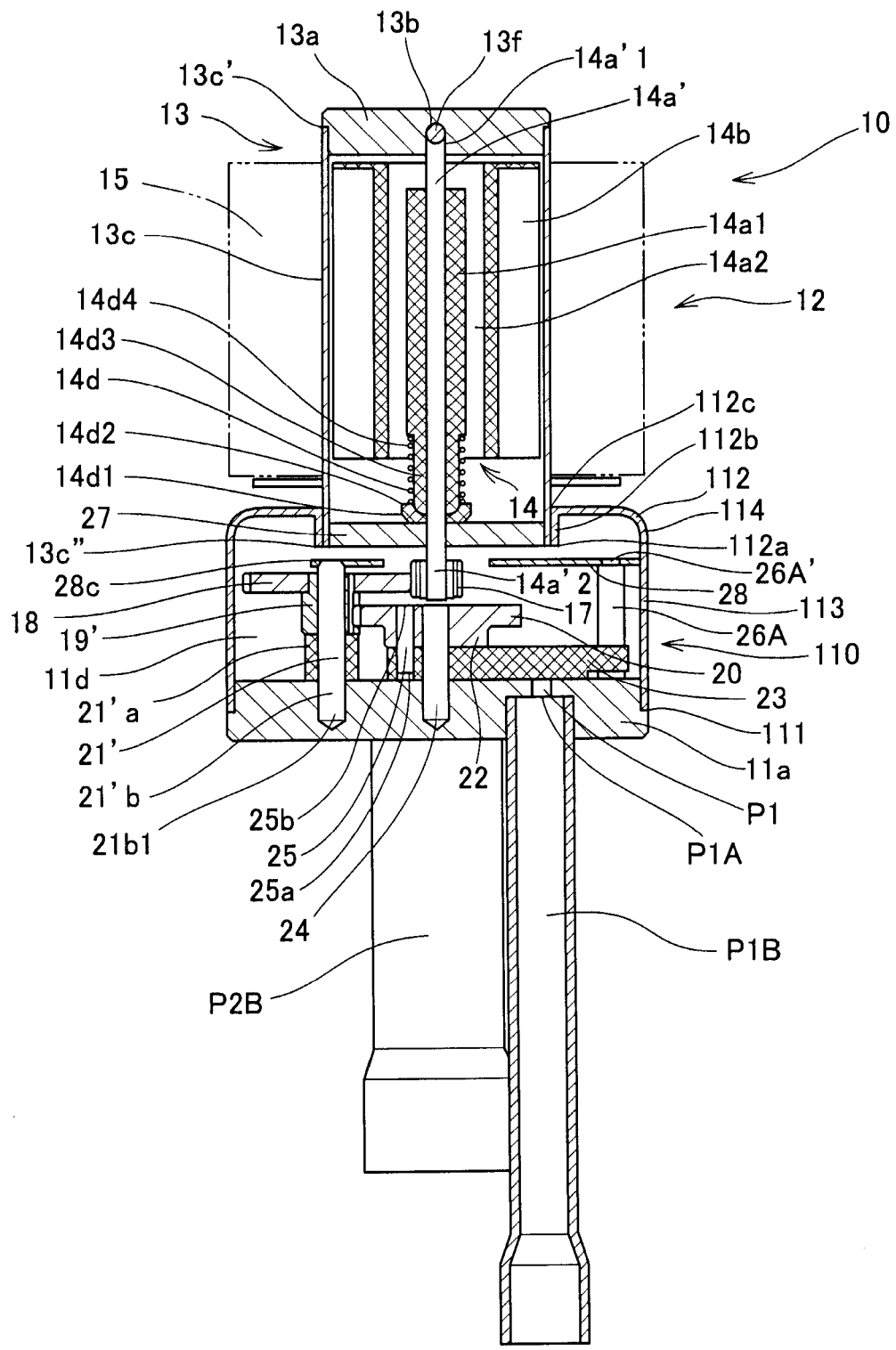
FIG. 6 is a longitudinal sectional view illustrating another embodiment of the invention.

Furthermore, another embodiment of the electric three-way valve 10 in which the housing 13 of the invention is attached as a separated constituent to the casing 11 is illustrated in FIG. 6.

That is, FIG. 6 is a longitudinal sectional view illustrating a structure of another embodiment of the invention. In FIG. 6, the same reference numerals of FIG. 1 will be given to the same or corresponding constituents to FIG. 1, and the description thereof will not be repeated.

In FIG. 6, a rotor shaft 14a' of the rotor 14 is longer than the rotor shaft 14a of FIG. 1, and the rotor shaft 14a' is inserted and fixed to the center of a cylindrical support member 14d which is formed of, for example, sintered magnet. Then, the cylindrical support member 14d is disposed at the center of the cylindrical member 14b of the rotor 14 and is fixed to the cylindrical member 14b by the injection-molding of resin, for example, PPS, thereby configuring the rotor 14. A resinous injection-molded portion 14a2 of the rotor 14 is provides as illustrated in the drawings. Furthermore, an upper end 14a'1 of the rotor shaft 14a' is supported by the concave portion 13b by the bearing 13f. The concave portion 13b is formed in the disk-like upper cap 13a of one circumferential end 13c' of the housing 13, and a lower end 14a'2 of the rotor shaft 14a' penetrates and protrudes to the center of the lower cap 27 so as to be inserted into the valve cavity 11d. The lower cap 27 is formed of a metal material, for example, stainless steel so as to have a disk shape, and is provided in the cover 13c which forms the housing 13. The lower cap 27 is fixed to the other circumferential end 13c" of the cover 13c by press-inserting or welding, for example, laser-welding. The rotor shaft 14a' is supported by the support member 14d disposed in the lower cap 27. The support member 14d includes the cylindrical portion 14d3 which is integrally formed so as to be connected to the disk portion 14d1 and the convex portion 14d2, and a spring 14d7 is wound on the outer periphery of the cylindrical portion 14d3. The rotor shaft 14a' penetrates the cylindrical portion 14d3 and the disk portion 14d1, and the disk portion 14d1 is disposed in the lower cap 27. The spring 14d7 is installed between an injection-molded portion 14a2 of the rotor 14 of the rotor shaft 14a' and the convex portion 14d2, and supports the rotor shaft 14a'. Furthermore, the casing 110 which constitutes the valve cavity 11d includes a side wall 113 which is formed of a metal material, for example, stainless steel, the side wall 113 includes one opening portion 111 and an apex portion 112, and the apex portion 112 includes a shoulder portion 114 which is formed by the connection to one opening portion 111. Furthermore, a front end portion 112a of the apex portion 112 is curved inside the valve cavity 11d, and forms a cylindrical wall portion 112b. In the apex portion 112, the other opening portion 112c is provided in the center of the apex portion 112 by the cylindrical wall portion 112b. As illustrated in FIG. 6, the other circumferential end 13c" of the cover 13c of the housing 13 and the lower cap 27 fixed to the other circumferential end 13c" are inserted into the other opening portion 112c. The other circumferential end 13c" is fixed by the cylindrical wall portion 112b through welding, for example, laser-welding along with the lower cap 27, and is installed inside the other opening portion 112c. As a result, the housing 13 which constitutes the motor unit 12 is attached as a separated constituent to a cylindrical casing 110. Furthermore, since the other circumferential end 13c" of the cover 13c of the housing 13 and the cylindrical wall portion 112b are welded, the housing 13 which constitutes the motor unit 12 is strongly fixed to the cylindrical casing 110, and is uprightly installed outside the casing 110.

Furthermore, in the valve cavity 11d which includes the cylindrical casing 110, the lower end 14a'2 of the rotor shaft 14a' protrudes into the valve cavity 11d, and the first gear 17 is fitted to the outer periphery of the lower end 14a'2 by press-inserting or laser-welding. Subsequently, the second gear 18 which meshes with the first gear 17, a third gear 19' which meshes with the second gear 18, and the fourth gear 20 which meshes with the third gear 19' have the same configuration as that of FIG. 1. However, in FIG. 6, the third gear 19' is different from that of FIG. 1, and is just configured as a single gear since there is no need to distinguish the gear operation of the upper-stage gear 19a and the lower-stage gear 19b illustrated in FIG. 1. The third gear 19' rotates with the rotation of the second gear 18, and is attached to the outer periphery of the bearing member 21'. Furthermore, the bearing member 21' is different from the bearing member 21 illustrated in FIG. 1, and is shorter than the bearing member 21. A lower end 21'b of the bearing member 21' is fitted and fixed to the valve seat 11a by press-inserting. The fixing may be performed by welding, for example, laser-welding. Since a shaft cap 21'a which is formed of metal, for example, stainless steel is press-inserted into the bearing member 21', the third gear 19' is supported, and the shaft cap 21'a is disposed between the third gear 19' and the valve seat 11a.

In this way, the first gear 17, the second gear 18, the third gear 19', and the fourth gear 20 constitute a gear set inside the casing 110. In response to the pulse signal input to the fixed coil 15 illustrated in FIG. 1, the rotor shaft 14a' rotates along with the rotation of the rotor 14 of the step motor 12, the gear set transmits the rotation in accordance with the rotation of the rotor shaft 14a', and the valve core 23 rotates in a sliding manner in the valve seat 11a. As a result, the electric three-way valve 10 illustrated in FIG. 6 selectively opens or closes the output port P1 and the output port P2 as in the case of FIGS. 5A and 5B. Furthermore, according to the embodiment illustrated in FIG. 6, the structure of the casing 110 is simplified and the structure of the valve cavity 11d equipped with the third gear 19' or the bearing member 21' is also simplified. Accordingly, it is possible to provide the electric three-way valve of which the number of constituents decreases, the attachability improves, and the cost decreases and which is capable of selectively opening or closing the output port P1 and the output port P2.

Figure 7:
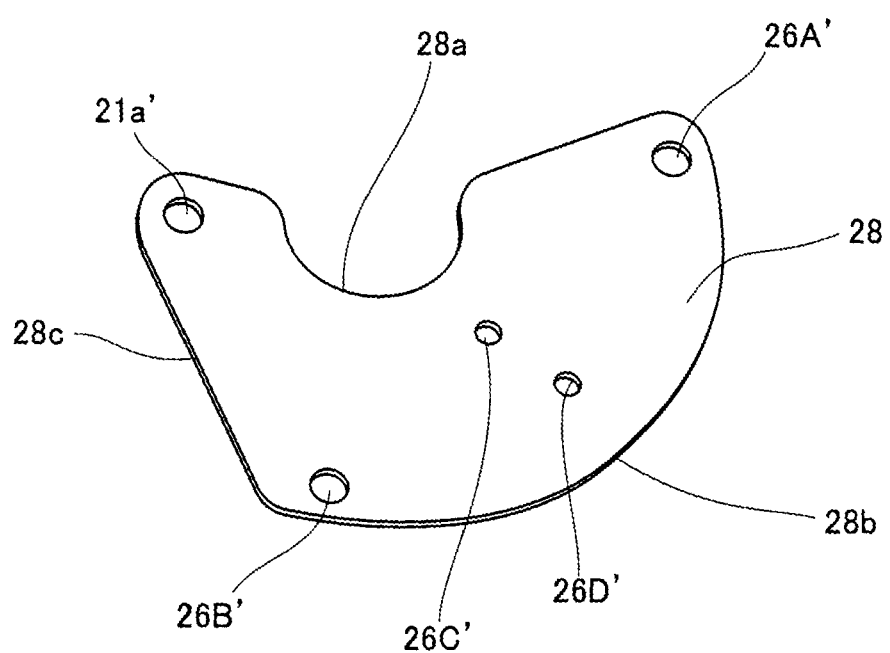
FIG. 7 is a plan view illustrating a pressure plate illustrated in the embodiment of FIG. 6.
Figure 8:
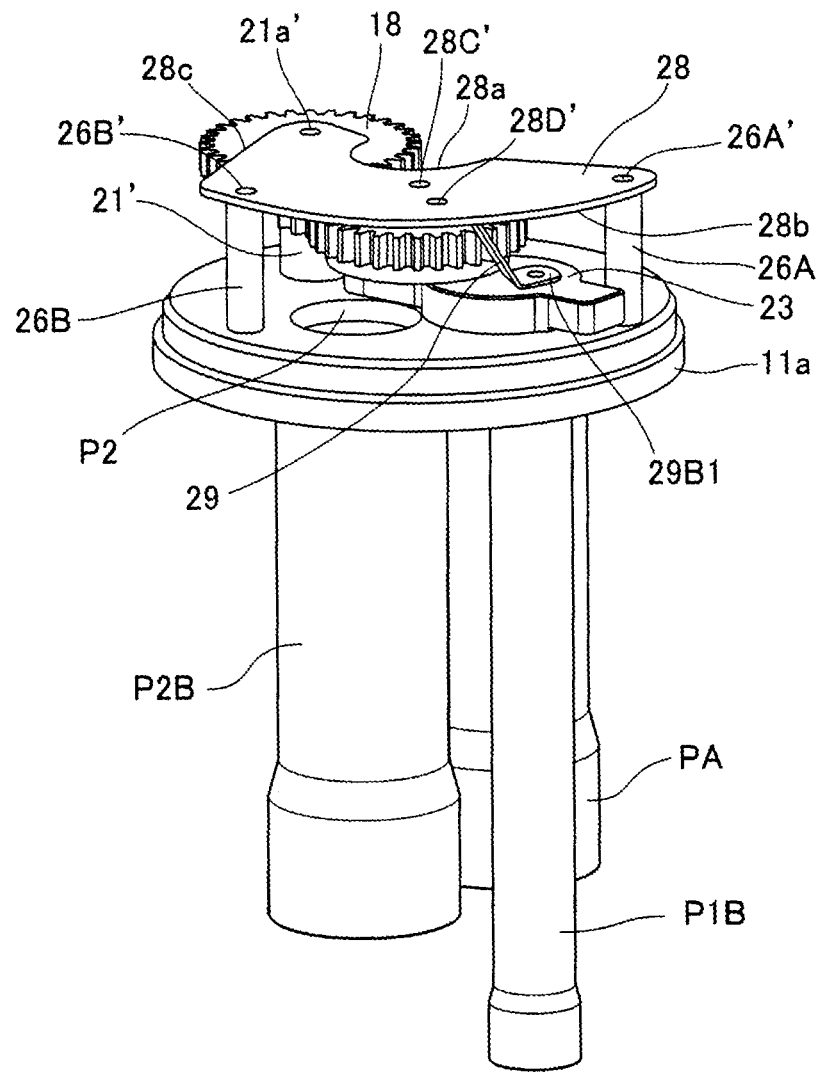
FIG. 8 is a perspective view illustrating a main part of the embodiment of FIG. 6.

Subsequently, in the embodiment illustrated in FIG. 6, the fixing strength of the valve seat 11a of pins 26A and 26B (not illustrated) with which the valve core 23 comes into contact by the sliding rotation further improves and the fixing strength of the valve seat 11a of the bearing member 21' also further improves. Accordingly, the pressure plate 28 which presses the bearing member 21' or the pins 26A and 26B may be disposed inside the valve cavity 11d. That is, as illustrated in FIG. 7, the pressure plate 28 is formed as a comparatively thin plate formed of metal, for example, stainless steel so as to have a substantially trapezoid shape. In FIG. 7, one edge of the pressure plate 28 is provided with a notched portion 28a, and as illustrated in FIG. 6, the rotor shaft 14a' is disposed inside the valve cavity 11d by the notched portion 28a. Furthermore, the pressure plate 28 is disposed as in the perspective view of FIG. 8, and FIG. 8 illustrates a main part of the electric three-way valve 10 illustrated in FIG. 6. That is, the pressure plate 28 comes into contact with the upper ends of the limiting pins 26A and 26B of which the lower ends are fixed to the valve seat 11a by press-inserting, and also comes into contact with the upper end of the bearing member 21'. Furthermore, one side edge 28b of the pressure plate 28 comes into contact with the inner surface of the side wall 113 of the cylindrical casing 110, and the other side edge 28c of the pressure plate 28 is provided with a predetermined distance with respect to the inner surface of the side wall 113. The side edge 28b of the pressure plate 28 may not be provided so as to come into contact with the side wall 113. In this way, since the pressure plate 28 is positioned inside the valve cavity 11d of the cylindrical casing 110, the pressure plate 28 is provided inside the valve cavity 11*d* while being disposed between the limiting pin 26A, the limiting pin 26B, the bearing member 21', and the lower cap 27. In FIGS. 7 and 8, contact portions 26A' and 26B' are provided between the pressure plate 28 and the limiting pin 26A and the limiting pin 26B, a contact portion 21*a*' is provided between the pressure plate 28 and the bearing member 21', and the contact portions 26A', 26B', and 21*a*' are formed by welding, for example, laser-welding. Accordingly, the limiting pins 26A and 26B and the bearing member 21' are strongly supported by the pressure plate 28. As a result, the limiting pins 26A and 26B and the bearing member 21' are strongly supported by the valve seat 11*a* and are strongly held by the pressure plate 28. Accordingly, the setting positions of the limiting pins 26A and 26B and the bearing member 21' in the valve seat 11*a* may be accurately maintained for a long period of time. Accordingly, it is possible to stably perform an operation of selectively opening or closing the output port P1 and the output port P2 by the valve core 23 of the electric three-way valve 10 without any change and accurately open or close the electric three-way valve 10 for a long period of time.

Figure 9A:
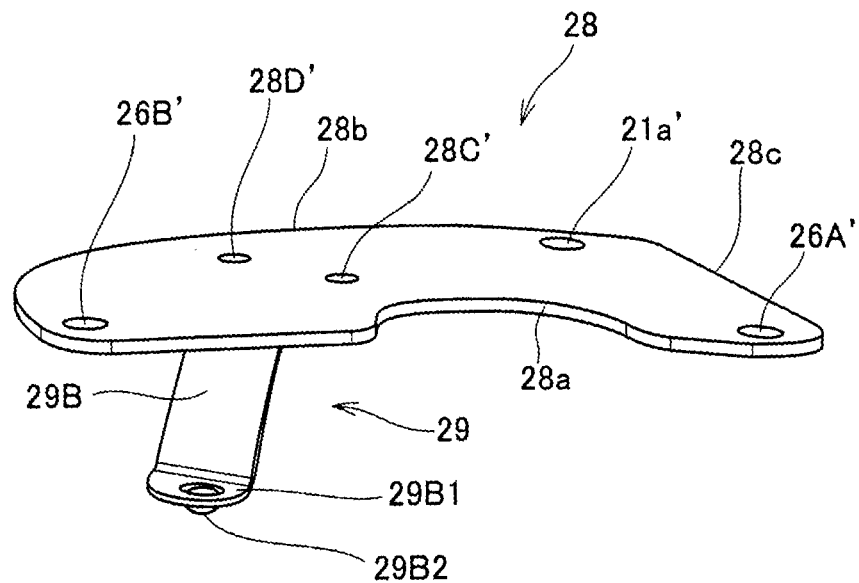
FIGS. 9A and 9B are perspective views illustrating a main part of another embodiment.
Figure 9B:
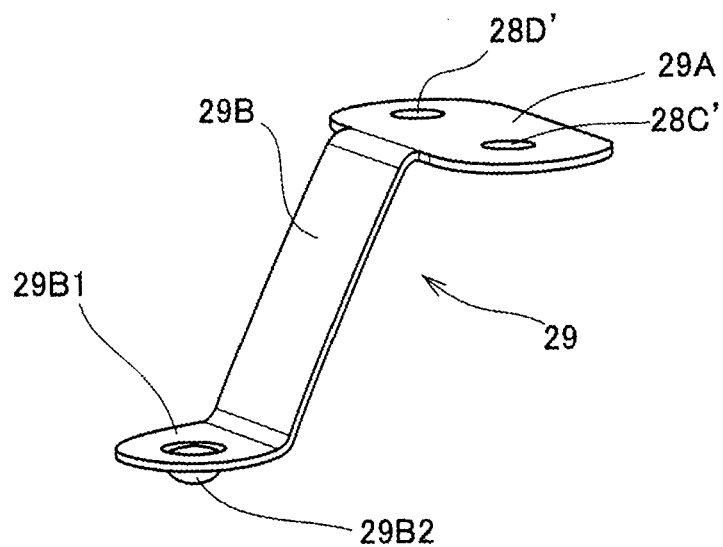

Furthermore, FIG. 9A illustrates a structure of a main part of another embodiment of the invention. FIG. 9A is a perspective view illustrating an embodiment in which a thin plate spring 29 is attached to the pressure plate 28 by welding, for example, spot-welding or using a pin. As illustrated in FIG. 9B, the plate spring 29 includes a plane substrate 29A and a spring portion 29B, the front end of the spring portion 29B is provided with a plane portion 29B1, and the plane portion 29B1 is provided with a semi-spherical convex portion 29B2. The spring portion 29B has a shape in which the plate width is identical or the plate width is enlarged from the substrate 29A toward the convex portion 29B2. However, the spring portion 29B is depicted so as to have a shape in which the plate width is identical in the drawings. Furthermore, welded portions 28C' and 28D' are provided in the substrate 29A, and in the drawings, the plate spring 29 is fixed to the pressure plate 28 by, for example, spot-welding. Based on this structure, as illustrated in FIG. 8, when the convex portion 29B2 (not illustrated) comes into contact with the valve core 23 by the elastic force of the plate spring 29 using the pressure plate 28 and the plate spring 29 and the valve core 23 slides on the valve seat 11*a*, the sliding may be further stably and accurately performed. Accordingly, it is possible to stably perform an operation of selectively opening or closing the output port P1 and the output port P2 by the valve core 23. As a result, the electric three-way valve 10 may perform the more accurate opening or closing operation for a long period of time.

Furthermore, FIG. 8 is a diagram illustrating an embodiment using the plate spring 29 in the perspective view illustrating a main part of the electric three-way valve 10. In the plate spring 29, when the valve core 23 slides on the valve seat 11*a* in the counter-clockwise direction and blocks the first output port P1, the valve core 23 receives the elastic force of the plate spring 29, and the valve core 23 reliably closes the first output port P1. Subsequently, when the valve core 23 slides on the valve seat in the clockwise direction, the valve core 23 blocks the second output port P2 without receiving the elastic operation of the plate spring 29.

What is claimed is:

1. An electric three-way valve comprising:
    an input port which is opened to a surface of a valve seat;
    a plurality of output ports which are disposed at the same interval and are formed as openings; and
    a valve core which rotates in a sliding manner in the valve seat by a driving force of a motor unit and selectively opens or closes the plurality of output ports,
    wherein the motor unit is attached as a separated constituent to an outside of an upper end surface of a cylindrical casing introducing refrigerant,
    wherein the valve seat is provided in an opening portion of a lower end of the cylindrical casing,
    wherein the valve core is driven by a gear unit which transmits the driving force of the motor unit and is disposed inside the cylindrical casing,
    wherein the cylindrical casing includes one opening portion and a side wall with an apex portion,
    wherein the valve seat is provided in the one opening portion,
    wherein the other opening portion is provided in the apex portion by the cylindrical wall portion,
    wherein a housing which is fixed to the cylindrical wall portion and is equipped with the motor unit is uprightly formed in the other opening portion, and
    wherein the housing is attached to the cylindrical casing
    wherein a limiting pin which comes into contact with a limiting portion of the valve core is provided in the valve seat, a pressure plate is disposed inside the cylindrical casing, and the pressure plate is fixed to an upper end of the limiting pin so as to hold the limiting pin.

2. The electric three-way valve according to claim 1,
    wherein the housing includes a lower cap, and the lower cap is fixed to the other circumferential end of the housing.

3. The electric three-way valve according to claim 1,
    wherein one side surface of the pressure plate comes into contact with the side wall of the cylindrical casing.

4. The electric three-way valve according to claim 3,
    wherein a plate spring is attached to the pressure plate, and the plate spring comes into contact with the valve core by an elastic force.

5. An electric switching valve comprising:
    an input port which is opened to a surface of a valve seat;
    a plurality of output ports which are disposed at the same interval and are formed as openings; and
    a valve core which rotates in a sliding manner in the valve seat by a driving force of a motor unit and selectively opens or closes the plurality of output ports,
    wherein the motor unit is attached as a separated constituent to an outside of an upper end surface of a cylindrical casing introducing refrigerant,
    wherein the valve seat is provided in an opening portion of a lower end of the cylindrical casing, and
    wherein the valve core is driven by a gear unit which transmits the driving force of the motor unit and is disposed inside the cylindrical casing
    wherein a center portion of the valve core is formed in a disk shape, the valve core includes flange portions symmetrically protruding toward both outsides from an outer periphery of the disk-like center portion, one flange portion of the valve core is formed as a bearing portion of a driving shaft of the gear unit, and the other flange portion of the valve core is formed as a stopping portion.

6. The electric switching valve according to claim 5,
    wherein the motor unit is a step motor and includes a cylindrical housing which is uprightly formed outward from an upper end of the cylindrical casing and is formed of a non-magnetic metal material, a rotor which is provided inside the housing, and a fixed coil which is provided in an outer periphery of the housing.

7. The electric switching valve according to claim 5,
    wherein the stopping portion of the valve core comes into contact with a stopping pin, and the stopping pin is disposed with a predetermined gap with respect to the plurality of output ports in the valve seat.

\* \* \* \* \*